United States Patent [19]

Cahall, Jr. et al.

[11] Patent Number: 4,982,349

[45] Date of Patent: Jan. 1, 1991

[54] RESPONSE TIME ANALYSIS SYSTEM

[75] Inventors: Theodore R. Cahall, Jr., Chicago; Frederick R. Holch, Franklin Park; Charles A. Sherwood, Hoffman Estates, all of Ill.

[73] Assignee: AT&T Bell Laboratories, Murray Hill, N.J.

[21] Appl. No.: 374,208

[22] Filed: Jun. 29, 1989

[51] Int. Cl.⁵ .............................................. G04F 11/00
[52] U.S. Cl. .................................. 364/569; 364/143; 377/20; 368/115
[58] Field of Search ............... 364/569, 550, 551.01, 364/143, 144; 377/20, 19; 368/89, 107, 110, 111, 113, 115

[56] References Cited

U.S. PATENT DOCUMENTS

| | | | |
|---|---|---|---|
| 4,161,787 | 7/1979 | Groves et al. | 377/20 X |
| 4,285,483 | 8/1981 | Cipollone | 377/20 X |
| 4,367,051 | 1/1983 | Inoue | 368/111 |
| 4,538,235 | 8/1985 | Henning | 377/20 X |
| 4,559,636 | 12/1985 | Goldrian | 377/20 |
| 4,612,623 | 9/1986 | Bazarnik | 377/20 X |
| 4,637,733 | 1/1987 | Charles | 364/569 X |
| 4,677,580 | 6/1987 | Saluski | 364/569 |
| 4,878,209 | 10/1989 | Bassett et al. | 368/113 |

Primary Examiner—Joseph L. Dixon
Attorney, Agent, or Firm—A. A. Tirva

[57] ABSTRACT

A terminal response time analysis system is disclosed for measuring the response time of a terminal system connected to a host processor. The terminal system has a keyboard for inputing information to the host processor and a monitor with a screen for displaying information received from the host.

11 Claims, 8 Drawing Sheets

RESPONSE TIME ANALYSIS SYSTEM

TECHNICAL FIELD

This invention relates to terminal systems and more particularly to apparatus and method for measuring the response time of such terminal systems.

BACKGROUND OF THE INVENTION

In todays business environment creating, processing, moving and accessing stored information are tasks that consume substantial amounts of time. Consequently, it is important to know how effectively and quickly these tasks are performed by the hardware and software systems utilized to accomplish these tasks.

A terminal system typically consists of a keyboard and a display monitor communicating with a host processor directly or via a controller. Terminal system response time is defined as the time elapsed from the instant a terminal user's request is generated by depression of a key on the keyboard until a response is received from the host and displayed on the screen of the display monitor.

Some commercially available terminals have built in features which allow them to internally measure their own response time measurements (RTM). While some of the built in RTM features do measure the response time fairly accurately, because they are internal to a system they are limited to a specific system, depend upon the internal timer resolution, are protocol specific and therefore cannot be directly compared to response times determined by terminal systems manufactured by other vendors.

SUMMARY OF THE INVENTION

In accordance with the present invention, we provide a response time analysis system which includes apparatus and method for measuring the response time of a terminal system wherein the apparatus is completely external to the system under test. Solenoid actuated mechanisms controlled by a software program running on a personal computer exercise ENTER and TAB keys of a terminal keyboard initiating requests for a predetermined test message to be displayed on the screen of a display monitor. A light pen, also controlled by the software program, determines when the message has been completely displayed by detecting the presence of a cursor in a predetermined location on the screen.

DETAILED DESCRIPTION

Figure 1:
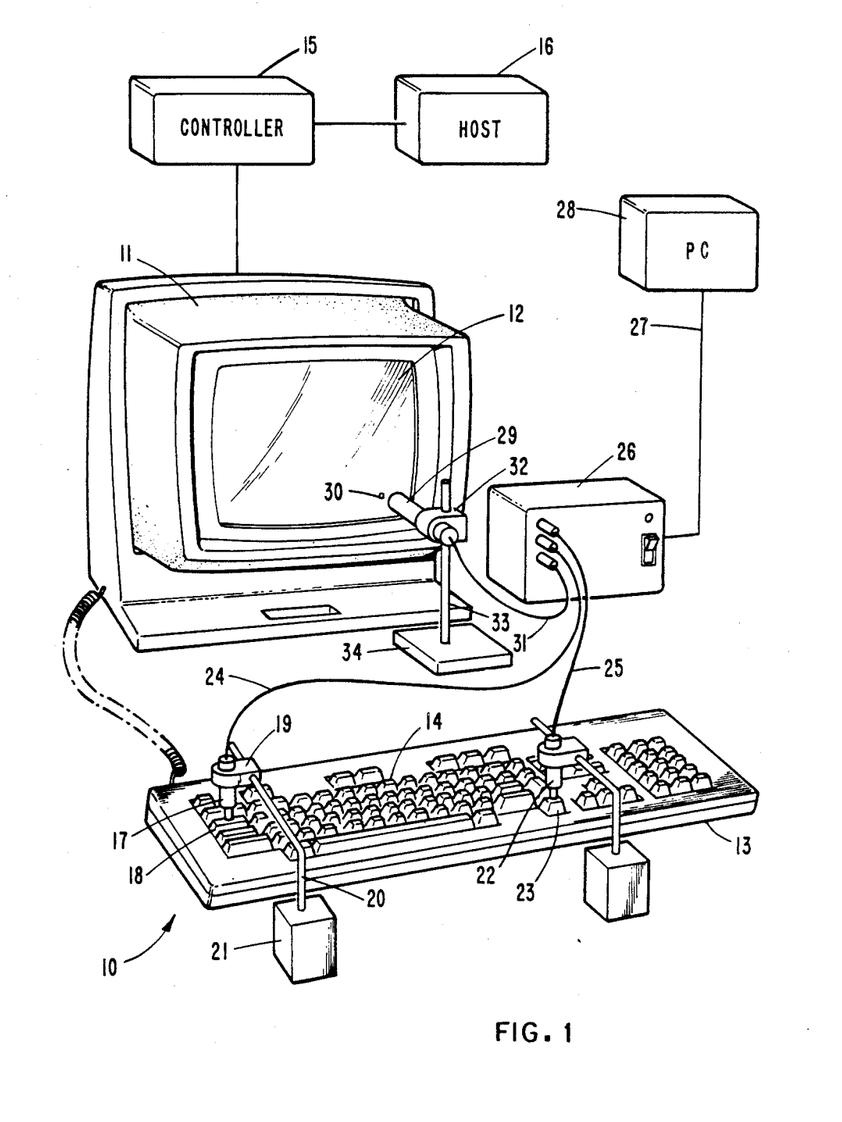
FIG. 1 is an illustration of a typical terminal system with response time measuring apparatus in place in accordance with the present invention.

FIG. 1 shows a typical terminal system 10 consisting of a display monitor 11 having a screen 12 and a stand alone keyboard 13 having a plurality of keys 14. The terminal system 10 may be connected either directly or via a controller 15 to a host processor 16. Terminal system 10 may be an AT&T 6529 display monitor and keyboard, controller 15 may be an AT&T 6544 multi-function communication controller, and the host processor 16 may be an AT&T 3B2 computer. The present invention is not limited for measuring response time of AT&T terminals but may be utilized with products of other manufacturers as well.

FIG. 1 further illustrates the general set up of the apparatus comprising the test analysis system. A solenoid actuated plunger 17 is supported over the keyboard 13 in a clamp 19 located on a rod 20 extending from a magnetic base 21. The plunger 17 is positioned directly over the TAB key 18. A solenoid actuated plunger 22 is supported in a similar manner above the keyboard 13 and is positioned directly above the ENTER key 23.

Figure 6:
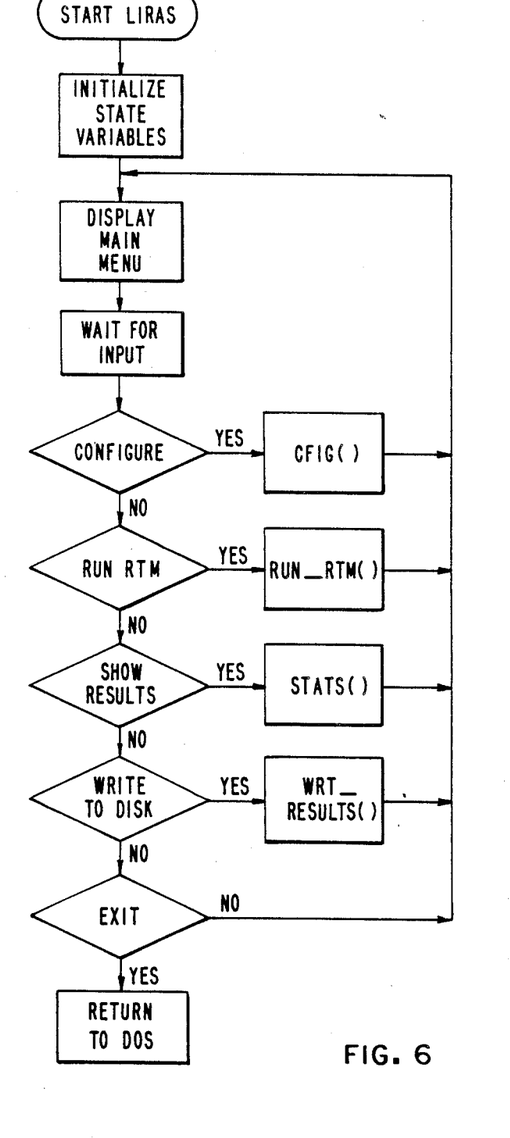
FIG. 6 is a flow diagram of the main software program LIRAS (Link Independent RTM Analysis System).

Cables 24 and 25 respectively connect solenoid plungers 17 and 22 to a hardware interface box 26 which in turn is connected via a cable 27 to a personal computer 28. The solenoid plungers 17 and 22 and the interface box 26 are controlled by a software program entitled LIRAS running on the personal computer 28 which may be an AT&T 6300 personal computer. Flow diagram for the LIRAS main routine is shown in FIG. 6 and will be discussed in more detail later on.

A light pen 29 is positioned in front of the display monitor 11 such that is can sense the presence or absence of a cursor signal 30 in a predetermined location of the screen 12. The light pen 29 is held in place by a clamp 32 mounted on a rod 33 extending from a flat magnetic base 34. The light pen 29 is connected via a cable 31 to the interface box 26 and is also controlled by the LIRAS software program.

Figure 2:
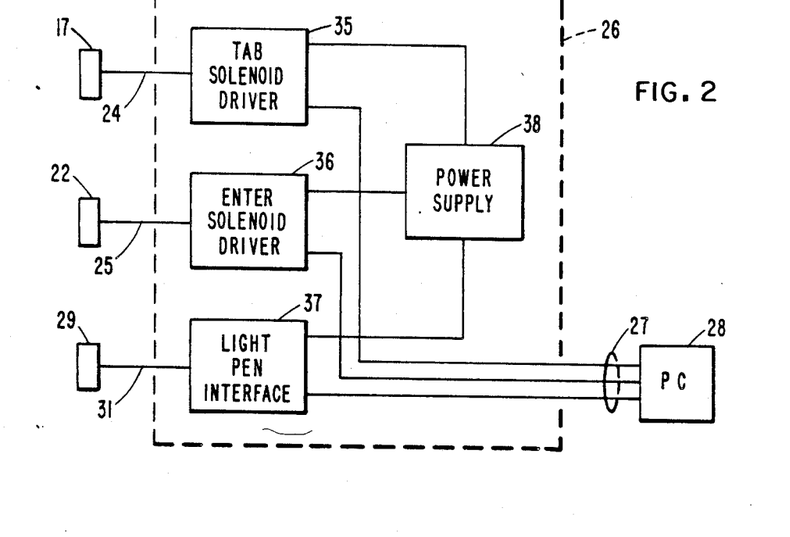
FIG. 2 is a block diagram illustrating significant components of the present invention.
Figure 3:
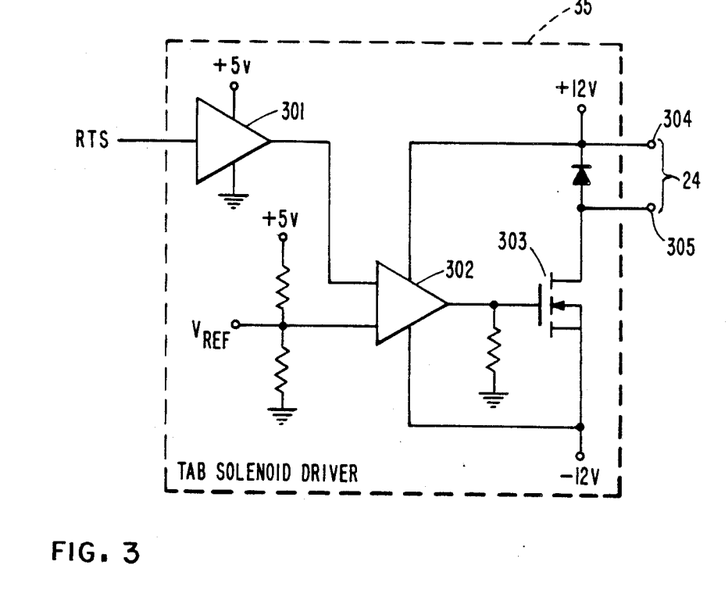
FIG. 3 is a schematic for the TAB solenoid driver circuit.
Figure 4:
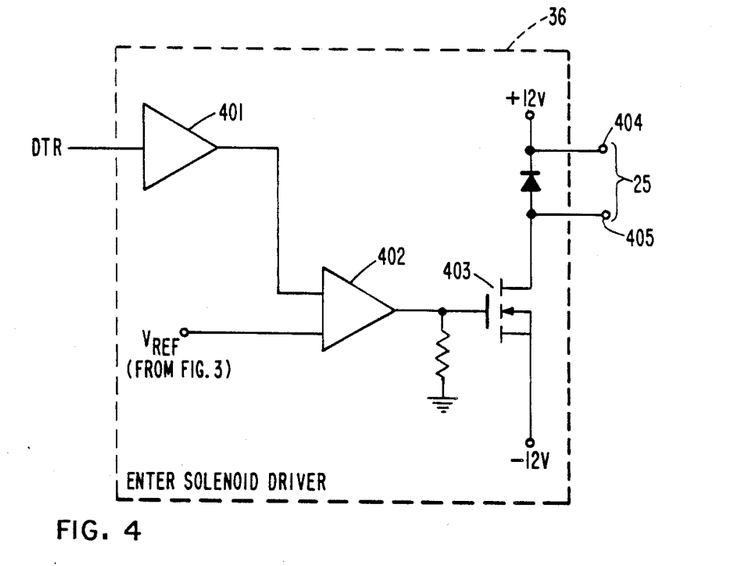
FIG. 4 is a schematic for the ENTER solenoid driver circuit.

FIG. 2 shows in block diagram form the major elements of the RTM analysis system and the interconnections between them. Solenoid actuated plungers 17 and 22 are 24 volt commercially available items manufactured by Dorning Industries. Circuits for TAB solenoid driver 35 and ENTER solenoid driver 36 are shown in FIG. 3 and 4, respectively. The solenoid driver circuits 35 and 36 are constructed with commercially available components and their operation will be discussed later or in conjunction with the dicussion of the LIRAS software program.

Figure 5:
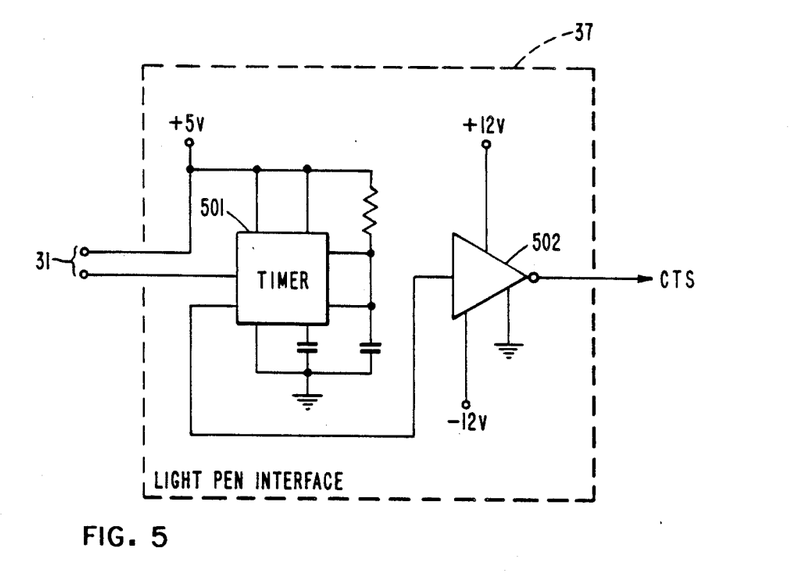
FIG. 5 is a schematic for the light pen interface circuit.

The light pen 29 is a commercially available part such as Teletype Corporation's part number 414091. The circuit for the light pen interface 37 is shown in FIG. 5. The circuit for the light pen interface is constructed with commercially available components and its operation will also be discussed in conjunction with the discussion of the LIRAS software program. A power supply 38 for the interface box 26 is a commercially available 12 volt ac/dc electronics model EVT351TB.

In addition to the external apparatus as shown and described above, a host based test system, available in most hosts, is required to generate and send a screen test message in response to the depression of the ENTER key 18 of the terminal's keyboard. The general set up and usage of the test system is as follows. The host internal test system is logged in and put into the manual mode. The light pen 29 is set up to detect the cursor 30 in the location on the screen 12 to which the cursor moves after the complete test message is displayed on the screen. The solenoid plungers 17 and 22 are then positioned over the TAB and ENTER keys 18 and 23 respectively, and the LIRAS main routine flow diagram, of which is shown in FIG. 6, is started. Once the main routine is started, it brings up a main menu having the following options (1) configure; (2) run RTM test; (3) display results; (4) write results on disk; and (5) exit program.

Figure 7:
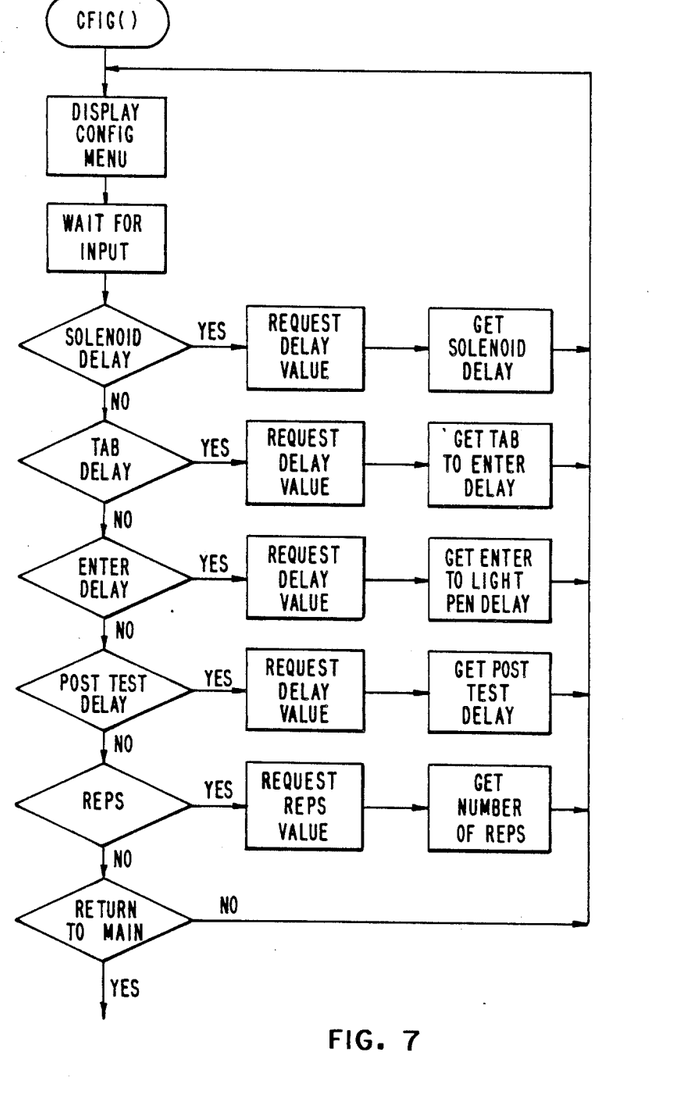
FIG. 7 is a flow diagram of the LIRAS configuration subroutine (cfig).

When the LIRAS configure option is selected, the main routine calls "cfig" subroutine a flow diagram of which is shown in FIG. 7. The "cfig" subroutine brings up a configuration menu allowing control options of the test to be changed. The configuration menu has the following options: (1) solenoid delay; (2) TAB to ENTER key delay; (3) ENTER to light pen delay; (4) post test delay; (5) test repetitions; and (6) return to LIRAS main routine.

The solenoid delay option allows to set the time during which the solenoid is extended. On a typical keyboard the minimum time needed to fully depress the ENTER key is 15 milliseconds. The LIRAS default for solenoid delay is 15 milliseconds. The TAB to ENTER key delay option allows to set the time delay in milliseconds after the TAB key is released until the ENTER key is depressed. The default for this delay is 50 milliseconds but may have to be increased to compensate for slow or protocol conversion devices. The ENTER to light pen delay option allows to set the time delay in milliseconds after the ENTER key is depressed to the time a signal generated by the light pen 29 is detected. The default for this delay is 0 milliseconds, but again this may have to be increased to compensate for protocol conversion devices. The post test delay defaults to 100 milliseconds and allows the controller 15 a short period fo time to reach a steady state. The test repetitions option allows to set the number of times the test will be repeated. This allows fewer repetitions to be run while system configuration perimeters are adjusted for various devices. The maximum number of repetitions allowed is 100.

These LIRAS defaults specified above are set for terminal systems with a keyboard similar to the AT&T 6538 keyboard. Keyboards that require greater pressure to depress a key will require a higher solenoid delay value. Likewise, protocol conversion devices typically require other delays to be increased to compensate for their line speeds and conversion processes.

Figure 8:
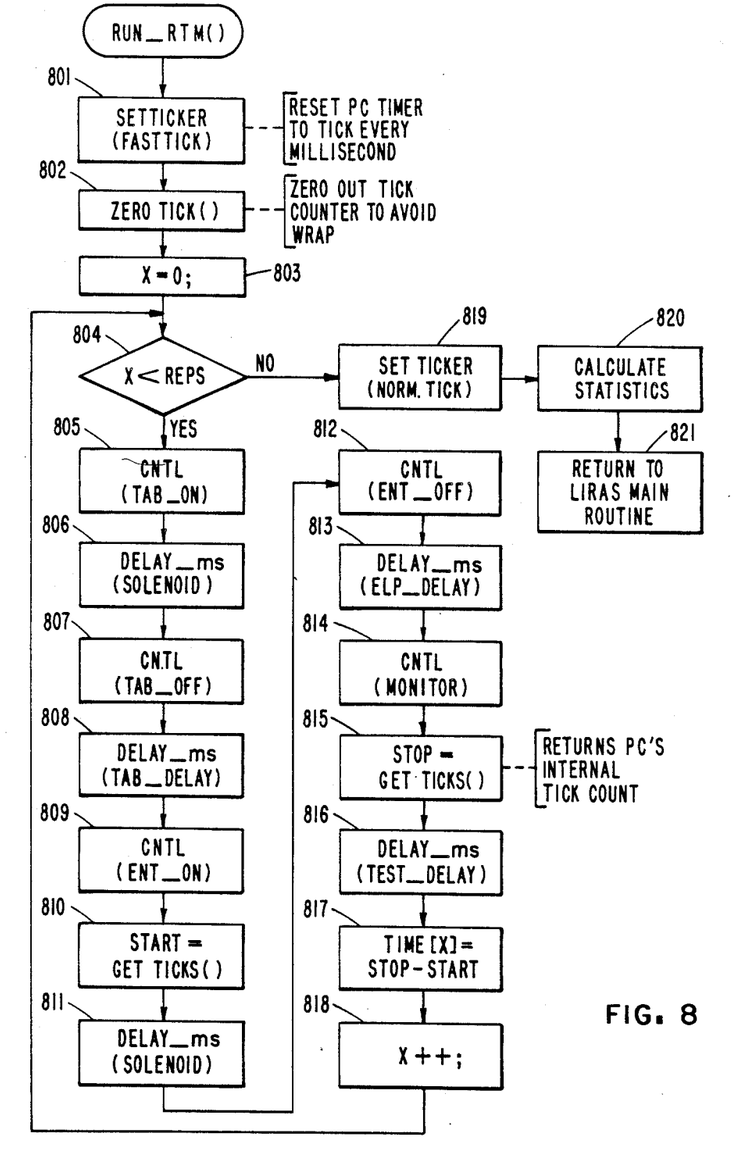
FIG. 8 is a flow diagram of the LIRAS RTM execution subroutine (run-rtm).

The run RTM option calls in a run RTM subroutine, a flow diagram of which is shown in FIG. 8, which begins the RTM analysis. The run RTM subroutine in function 801 initially reprograms the personal computer's timer chip to tick every millisecond from its normal operation which is 1 tick every 53 milliseconds. This is done to increase the timing resolution of the RTM. All communications between the interface box 26 and the LIRAS software program are implemented via the personal computer's 28 serial port (not shown). Three serial port leads were used to accomplish this. Two to control the solenoid plungers 17 and 22 and one to read the light pen 29 status.

The interface 26 uses a control lead from the serial port to determine whether to extend the solenoid or not. When the leads is in the active state the solenoid is extended. It is left extended until the lead goes back to the inactive stage. Since there are two solenoids to be controlled, two separate serial port control leads RTS and DRT are input to the TAB and ENTER solenoid driver circuits 35 and 36 respectively, as shown in FIGS. 3 and 4.

In response to the activation of RTS lead, TAB driver circuit 35 (FIG. 3) responds as follows. An RS233-EIA Receiver 301, which may be a commercially available device such as MC1489, in response to the active state of the RTS lead ($-12$ volts), outputs a logic 1 which is input to a quad voltage comparator 302, which may be a commercially available device such as LM239. The output of the comparator 302 is zero volts and is applied to the gate of a N channel MOSFET transistor 303 which in response allows 24 volts to be applied to leads 304 and 305 of cable 24 connected to the TAB solenoid 17. Application of 24 volts to the TAB solenoid 17 extends it's plunger and depresses TAB key 18.

The ENTER solenoid driver circuit 36 is substantially identical in make up and operation to the TAB solenoid driver circuit 30 and does not need to be discussed in detail. Application of 24 volts to leads 404 and 405 of cable 25 extends the plunger of ENTER solenoid plunger 22 and depresses the ENTER key.

The RTM analysis system requires depression of the TAB key, before the ENTER key is depressed, because when the ENTER key is used to initiate the host transaction the previous screen test message is still displayed with the cursor in the predetermined position to which the cursor goes to after the test message is displayed. If the light pen 31 were to be achieved at this point, it would falsely think that the RTM was complete because the cursor was already present at the predetermined location.

When the tab key 18 is depressed prior to depression of the ENTER key 23, it moves the cursor away from the light pen's cursor detection area. Now when the light pen 29 is activated, it does not detect the cursor even though the screen test message may still be displayed on the screen 12. The host 16 responds to the depression of the ENTER key 23 by rewriting the test screen message. The light pen 29 now detects the new cursor 30 in the predetermined cursor detection area and signals the completion of display of the screen test message to the RTM subroutine.

The third control lead CTS as shown in FIG. 5 is used to communicate light pen status information between the light pen interface circuit 37 and the LIRAS program. An 8 millisecond pulse is output via the CTS lead by the interface circuit 37 when the light pen 29 detects the presence of the cursor in the predetermined area on the screen 12. The 8 millisecond -12 volt pulse on the CTS lead is generated by the light pen interface circuit 37 in response to the receipt of 1 microsecond pulse from light pen 29. A LM555 timer chip 501 stretches the 1 microsecond pulse out to 8 milliseconds which is input to an MC1488 RS232-EIA driver 502. Driver 502 outputs an 8 millisecond -12 volt pulse on the CTS lead the presence of which signals to the RTM subroutine that the cursor has been detected, i.e. screen test message is displayed on the screen.

Figure 9:
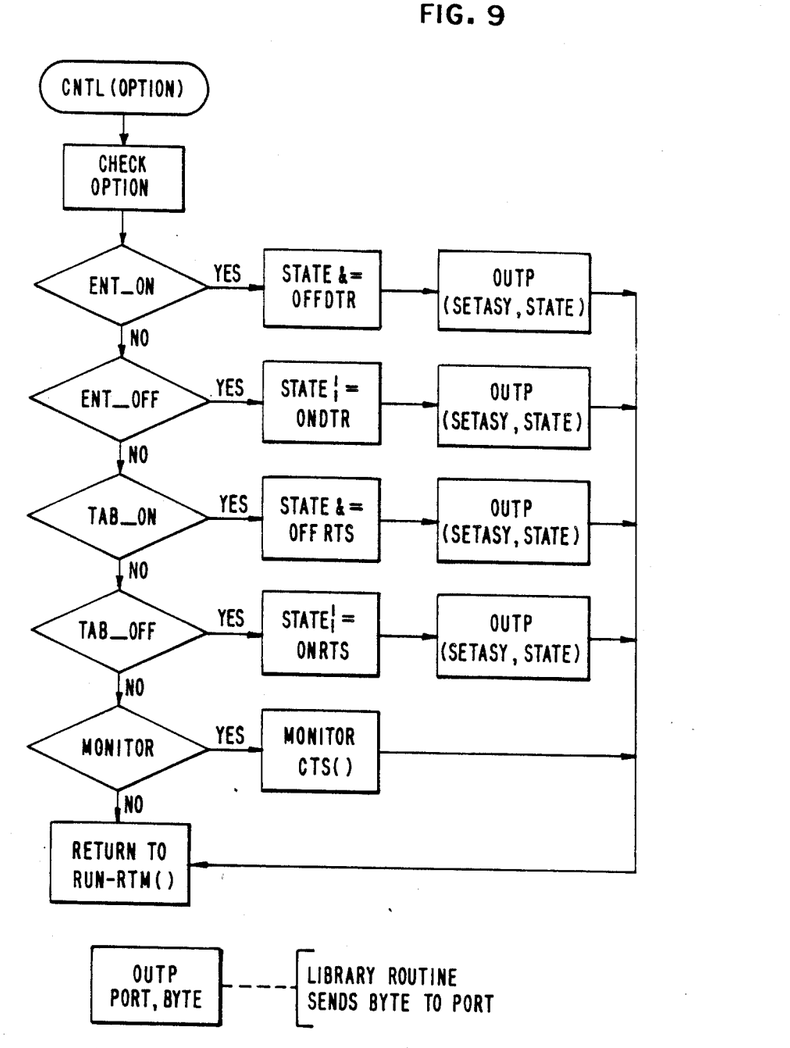
FIG. 9 is a flow diagram of the LIRAS apparatus control subroutine (cntl).

Function 802 zeroes out the tick counter to assure that it does not wrap during timing. The loop counter is zeroed out in function 803. Function 804 determines whether to proceed with the test or return to LIRAS main routine. If decision is to proceed with the test, function 805 commands that the RTS lead be activated by calling LIRAS hardware control subroutine "cntl", a flow diagram of which is shown on FIG. 9. The "cntl" subroutine in response to the request activates the RTS control lead. The TAB solenoid driver circuit 35 (FIG. 3) in response to the activation of the RTS lead applies 24 volts to the TAB solenoid thereby extending the plunger and depressing TAB key 18.

After a predetermined time delay provided by function 806, function 807 calls in "cntl" subroutine directing it to deactivate the RTS lead. In response to deactivation of the RTS lead, the TAB key solenoid is withdrawn and the TAB key 18 is released. Function 808 provides a predetermined time delay after the TAB key control lead RTS is deactivated. After the time delay, function 809 of the RTM subroutine calls in the "cntl" subroutine to activate the DTR lead in response to which the ENTER solenoid driver circuit 36 extends depressing the ENTER key 23.

Figure 10:
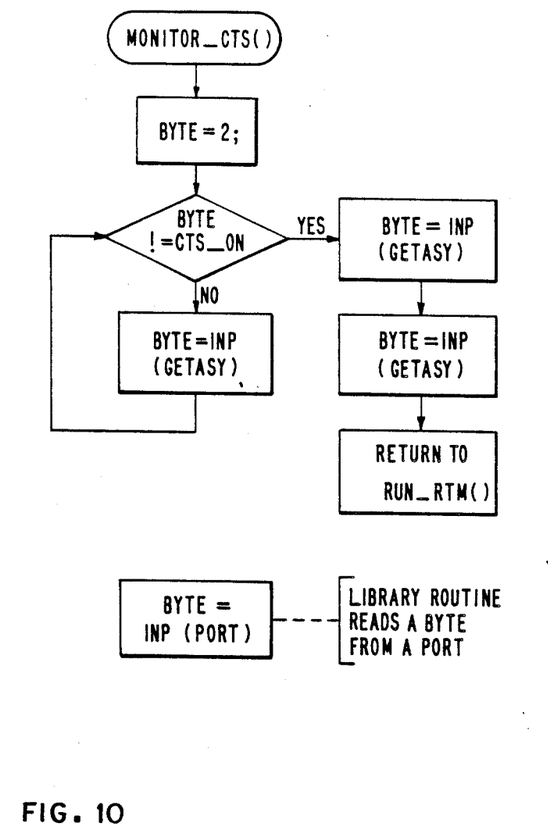
FIG. 10 is a flow diagram of the LIRAS monitor CTS subroutine (monitor).

Function 810 looks up the time on the internal timer and, after a predetermined time delay provided in function 811, function 812 calls "cntl" subroutine to deactivate the DTR lead. After a predetermined time delay provided in function 813, function 814 calls "cntl" subroutine which in turn calls a MONITOR CTS subroutine to determine when the test message has been completely displayed on the screen 12. The flow diagram for the MONITOR CTS subroutine is shown in FIG. 10. The MONITOR CTS subroutine checks whether an 8 millisecond pulse is present on the CTS lead which occurs when the light pen 29 has detected the presence of the cursor on screen 12.

After the MONITOR subroutine determines that the CTS lead has been activated, it returns control to the run RTM subroutine whether function 815 reads the timer. Function 816 provides time delay required for the system to stabilize after which function 817 determines the elapsed time, function 818 increments the loop counter and function 804 decides whether to repeat the test or to reset internal system timer in function 819, calculates statistics in function 820 and function 821 returns control to the LIRAS main routine.

After control is returned to the LIRAS main routine (FIG. 6), options to display results or write results on a disk may be exercised or, in the alternative, the test may be reconfigured and rerun.

We claim:

1. Apparatus for measuring response time of a terminal system connected to a host computer, said terminal system having a keyboard with a plurality of keys for inputting information to the host computer and a monitor with a screen for displaying information received from the host computer said measuring apparatus comprising:

means for initiating a request to the host computer to transmit a test message to be displayed on the screen of the monitor;

means for determining when such message has been displayed on the screen wherein said determining means includes means for detecting a cursor in a predetermined position on the screen; and means for controlling such initiating and determining means wherein said controlling means includes means for calculating the response time of the terminal system in response to information received from said initiating and determining means.

2. Apparatus of claim 1 wherein said initiating means includes means for depressing a predetermined key on said keyboard in response to a signal from said controlling means.

3. Apparatus of claim 2 wherein said means for depressing includes a solenoid operated plunger located above said predetermined key.

4. Apparatus of claim 3 wherein said means for depressing further includes a driver circuit for said solenoid operated plunger which circuit in response to the signal from said controlling means applies a potential to the solenoid to extend the plunger and depress the predetermined key.

5. Apparatus of claim 1 wherein said detecting means includes a light pen positioned against a predetermined portion of the screen, said pen generating a signal when a cursor is detected in said portion on the screen.

6. Apparatus of claim 5 wherein said detecting means further includes a light pen interface circuit while in response to a signal from said light pen generates a signal to said controlling means indicating that test message has been displayed on the screen.

7. Apparatus of claim 1, wherein said controlling means includes a digital computer.

8. Apparatus of claim 7, wherein said digital computer is controlled by a stored program.

9. Apparatus of claim 1, wherein said apparatus is external to said terminal system and said host computer.

10. A method for determining response time of a terminal system connected to a host computer, said terminal system having a keyboard with a plurality of keys for inputting information to the host computer and a monitor with a screen for displaying information received from the host computer, said method comprising the steps of:

initiating a request to the host computer to transmit a predetermined test message to be displayed on the screen wherein said initiating step comprises:

depressing a TAB key on said keyboard and after a predetermined period of time depressing an ENTER key on said keyboard;

detecting when such test message has been completely displayed on the screen, controlling the initiating and detecting steps with a computer program running on an independent processor, recording time information associated with the initiating and detecting step, and utilizing said time information to determine the terminal system response time.

11. The method as said forth in claim 10 wherein said detecting step comprises determining whether a cursor is present in a predetermined position on the screen and communicating said information relating to the presence of the cursor to the computer program.

* * * * *